United States Patent
Baier

(10) Patent No.: US 10,553,250 B2
(45) Date of Patent: *Feb. 4, 2020

(54) AUTOMATIC HIGH QUALITY RECORDINGS IN THE CLOUD

(71) Applicant: ADOBE INC., San Jose, CA (US)

(72) Inventor: Tobias Baier, Kakenstorf (DE)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,817

(22) Filed: Mar. 1, 2019

(65) Prior Publication Data
US 2019/0198059 A1  Jun. 27, 2019

Related U.S. Application Data

(63) Continuation of application No. 14/841,936, filed on Sep. 1, 2015, now Pat. No. 10,229,715.

(51) Int. Cl.
*G11B 27/034* (2006.01)
(52) U.S. Cl.
CPC .................. *G11B 27/034* (2013.01)
(58) Field of Classification Search
CPC .................................................. G11B 27/034
USPC ......................................................... 704/503
See application file for complete search history.

(56) References Cited

U.S. PATENT DOCUMENTS

| 2005/0068876 A1* | 3/2005 | Tanaka ............. G11B 20/00007 369/59.25 |
| 2011/0251840 A1 | 10/2011 | Cook et al. |
| 2013/0085586 A1 | 4/2013 | Parekh |
| 2015/0081905 A1* | 3/2015 | Baalu ....................... H04S 7/30 709/225 |
| 2016/0112872 A1 | 4/2016 | McClement et al. |

\* cited by examiner

*Primary Examiner* — Bharatkumar S Shah
(74) *Attorney, Agent, or Firm* — Finch & Maloney PLLC

(57) ABSTRACT

Techniques are disclosed for producing high quality losslessly compressed audio tracks based on conversations between participants remote from one another, such as conversations that occur during a telephonic interview or online conference, or other conversations that take place over a network between two or more participants. In an embodiment, each participant's device includes an audio chat client configured to record that participant's audio contribution to the conversation and store a non-compressed version of the contribution locally. A first version of the captured audio is generated with lossy compression and pushed in real time to a cloud-based service, for purposes of the live conversation. A second version of the captured audio for subsequent playback is generated and stored with lossless compression and is pushed asynchronously to the service. The service is configured to automatically provide a multitrack project with high quality audio tracks from each participant.

20 Claims, 5 Drawing Sheets

AUTOMATIC HIGH QUALITY RECORDINGS IN THE CLOUD

CROSS-REFERENCE TO RELATED APPLICATIONS

This application is a continuation of U.S. patent application Ser. No. 14/841,936, filed Sep. 1, 2015, which is hereby incorporated herein by reference in its entirety.

FIELD OF THE DISCLOSURE

This disclosure relates to techniques of producing media, and more particularly, to techniques of recording and editing audio tracks.

BACKGROUND

Due to bandwidth limitations, conventional telecommunications technology that is typically carried out using the existing copper wire infrastructure uses compressed audio signals to enable communications between parties in real time. This use of audio compression technology, however, causes other problems for media production personnel because recordings based on compressed audio signals are typically of poor or otherwise low quality, relative recordings based on uncompressed audio signals. To generate better quality recordings of conversations between participants that are remote from each other, some media production personnel turn to "double-ender" recordings rather than relying on a live recording of the live telephone conversation itself (which is susceptible to the previously mentioned bandwidth constraints). In a double-ender recording, each participant is recorded at their respective remote location and, after the session is complete, all recordings are collected at one location. At this location, media production personnel inspect and manipulate the collected recordings using recording software and construct a single recording based on the collected recordings. The newly created single recording can then be stored and played back as desired. A typical scenario where double-ender techniques can be used is an interview conducted over bandwidth constrained medium, where the interviewer is remote from the interviewee, and it is desired to preserve and later broadcast that interview. Podcasts that are available via the Internet are one example of content sometimes produced using double-ender techniques.

DETAILED DESCRIPTION

Figure 1:
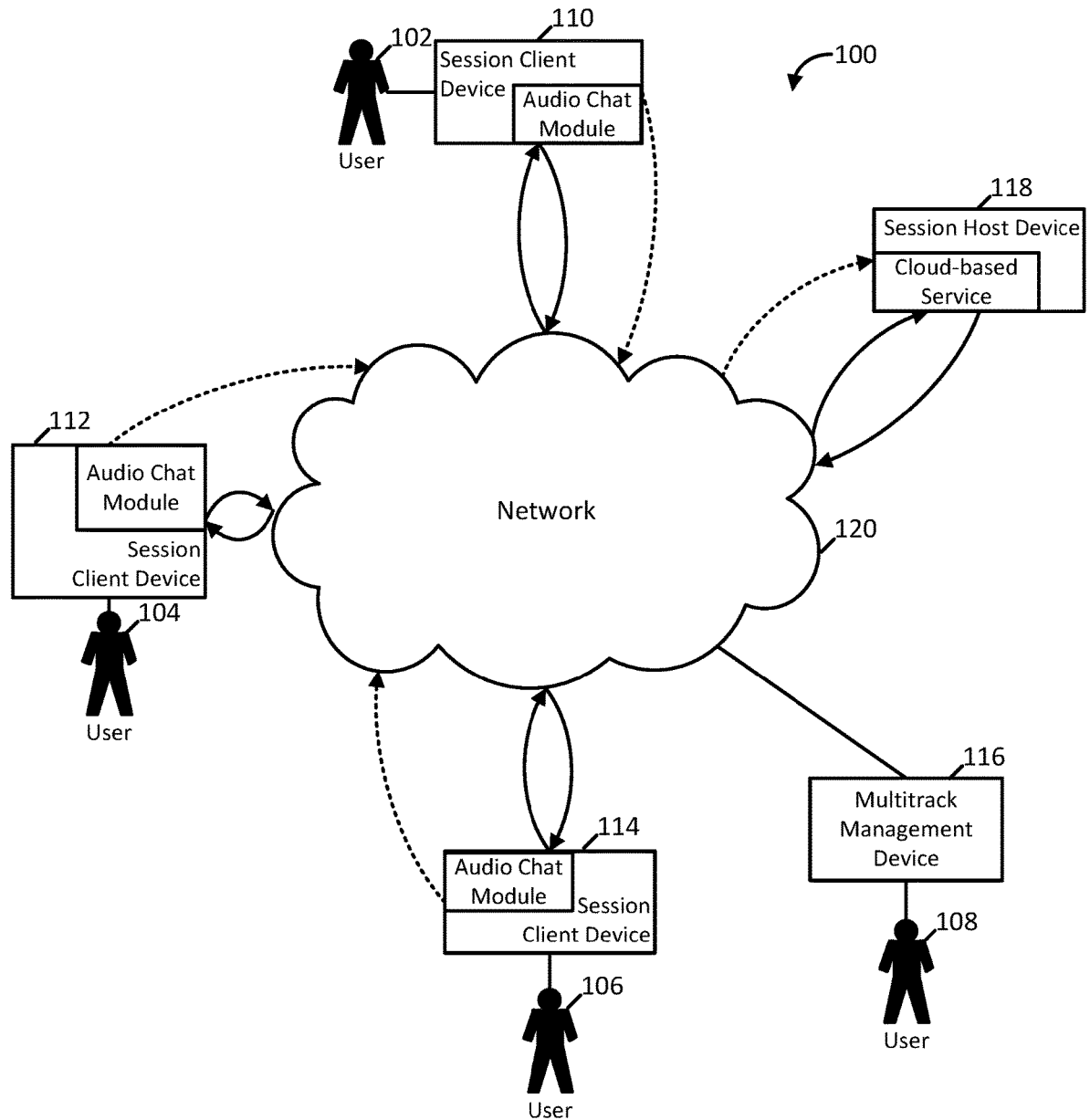
FIG. 1 is a block diagram illustrating an example communication session recording system in accordance with one or more embodiments of the present disclosure.

Techniques are disclosed for producing high quality (e.g., losslessly compressed or uncompressed) audio tracks based on conversations between participants remote from one another, such as conversations that occur during a telephonic interview or online conference, or other conversations that take place over a network between two or more participants. In an embodiment, each participant's device includes an audio chat client configured to record that participant's audio contribution to the conversation and store an uncompressed version of the contribution locally. A first version of the captured audio is generated with lossy compression and pushed in real time to a cloud-based service, for purposes of the live conversation. A second version of the captured audio is generated and stored with lossless compression (or no compression) and is pushed asynchronously to the service. The service is configured to receive both versions, to automatically align the asynchronously received second version to the synchronously received first version, and to automatically provide a multitrack audio project based on the high quality (lossless compression/uncompressed) audio from each participant, for purposes of subsequent playback (e.g., podcast or other pre-recorded production). Users are supported to organize an audio call and conduct it, with the option to add marks to the session to facilitate later finding of events-of-interest within the conversation (e.g., start-of-recording, end-of-recording, and special chapter marks).

General Overview

As previously explained, conventional telecommunications recording techniques such as the double-ender provide a number of benefits, including high-quality production with clear video and/or audio. However, such techniques also suffer from disadvantages, depending on the application. For example, double-ender recordings require elaborate and costly manual effort to collect and splice or otherwise align the individual recordings to ensure that each participant's speech is rendered in the correct sequence. In some instances, this alignment activity may only be completed by experienced audio engineers. In addition, conventional double-ender recording processing fails to take advantage of the also previously recorded, compressed audio signals in the innovative manner described herein. Such compressed audio is typically recorded at the same time the individual double-ender recordings are made, but not used.

Thus, and in accordance with an example embodiment of the present disclosure, a system is disclosed for producing high quality losslessly compressed or uncompressed audio tracks based on conversations between participants remote from one another. The system can be implemented in the context of a client-server architecture and includes a client based audio chat module in each participant's computing system, and a server-based multitrack generation service that is accessible to the clients via a communication network. Each audio chat module is programmed or otherwise configured to acquire a participant's audio contribution to the conversation; generate and transmit a first compressed version of the participant's contribution for purposes of the live conversation; generate, locally store, and subsequently transmit a second compressed or uncompressed version for purpose of subsequent playback; and automatically send both those versions to the remote service via the network.

The first version of the captured audio provided by the audio chat module is generated with lossy compression and pushed in real time to the multitrack generation service, which is used for the live conversation being carried out between the participants. Any suitable real time audio chat compression methodology may be used (e.g., such as that used for SKYPE, GOOGLE HANGOUT, or MUMBLE). For purposes of creating a high quality recording of the same conversation for storage and subsequent playback, the second version of the captured audio is generated and stored with lossless compression and is pushed asynchronously to the service. Any number of lossless codecs can be used to generate this second version. In any case, because the push of the second version to the multitrack generation is asynchronous, the push can be carried out as bandwidth allows whether it be during the conversation or otherwise after the conversation has ended.

The remote multitrack generation service is programmed or otherwise configured to receive both versions of the captured audio from each participant, to automatically align the asynchronously received second version to the synchronously received first version, and to automatically provide a multitrack project based on the second version having high quality (lossless compression or no compression) from each participant, for purposes of subsequent playback. To perform the automatic alignment, the remote multitrack service is programmed or otherwise configured to store the first version in, or in association with, a first multitrack project that includes or references all of the lossy audio captured from each participant. The remote multitrack service is further programmed or otherwise configured to use the first multitrack project as a timing template for a second multitrack project that includes or references all of the uncompressed or losslessly compressed audio captured from each participant. This second multitrack project can thus be used or otherwise made available, for example, for podcasts, on-demand service, or some other pre-recorded production. In one example embodiment, the remote multitrack generation service is provided as a cloud-based service. Note that reference to cloud herein may refer to a public or private network, such as a cloud-based service available to the public via the Internet or a cloud-based service available to a given company via a campus-wide network. In any such cases, the remote multitrack generation service effectively acts as an audio conversation server, enabling audio conversation sessions with multiple participants.

In one example embodiment, each participant sends the highly compressed audio signal (lossy first version) to the server, while the server sends an N−1 mix back to each participant, wherein N−1 is the sum of all audio signals minus the signal of the respective participant. While having an audio conversation, the service also tracks all audio signals and stores their timings in a project file. After a conversation has ended, the service uses this project file and the high quality audio files sent in by the participants after the conversation concludes, to create an online project with all high quality files arranged in the correct alignment. In one example embodiment, high quality tracks are synchronized to their low quality pendants automatically using "start track" marks known by the client and the server (both know when the client has started sending the low quality live content), as well as amplitude matching, since both, the low quality (first version) and the high quality (second version) tracks represent the same spoken audio. This project containing all high quality tracks can be, for example, downloaded and handled by an audio engineer like a normal multitrack audio project, manipulated online without the need to download the large high quality audio files, or exported as a down mix online, to name a few examples.

According to some embodiments, users (participants) are supported to organize an audio call and conduct it, with the option to add marks to the session to facilitate later finding events-of-interest within the conversation (e.g., start-of-recording, end-of-recording, and special chapter marks). The client machine executing the audio chat module may be, for example, a laptop, desktop, or work station computer, but can also be, for instance, a mobile phone, tablet, or other portable computing device. As will be appreciated, the audio chat module can be used to create high quality double-ender productions in a relatively easy manner for unexperienced users (e.g., interviewees). As will be further appreciated, the techniques provided herein also support more than two participants and could thus also be used for high quality multi-ender productions.

Numerous embodiments and applications will be apparent in light of this disclosure. For instance, multitrack file generation systems disclosed herein can be used to automatically generate high quality reproductions of communication sessions (e.g., conversations) attended by a plurality of participants. In some embodiments, a communication session host device (e.g., server or other central computing system) facilitates these communication sessions by receiving multiple inbound streams of compressed audio data from session client devices and transmitting outbound streams of compressed audio data to participants in real time. In these embodiments, the session host device also generates a first multitrack file that organizes the inbound compressed audio data into a set of audio tracks. Each of these tracks may include information descriptive of the session client device that originated the stream associated with the track, a communication session of which the stream is a part, and marker information that specifies start times, end times, and intermediate milestone times within the stream.

In some embodiments, the session client devices exchange inbound and outbound streams with the session host device and also locally store high quality reproductions of the audio data recorded by the session client device. As bandwidth becomes available, the session client devices transmit packets including the high quality reproductions to the session host device. Further, in these embodiments, the session host device parses and stores the high quality reproductions as the packets are received. In some embodiments, in response to detecting the communication session has ended and the high quality reproductions are available, the session host device automatically generates a second multitrack file based on the first multitrack file. The second multitrack file organizes the high quality audio data into a set of high quality tracks. Each of these high quality tracks may include information descriptive of the session client device that originated the stream associated with the track, a communication session of which the stream is a part, and marker information that specifies start times, end times, and intermediate milestone times within the stream.

Numerous benefits and advantages of the techniques provided herein will be appreciated in light of this disclosure. For instance, a system as provided herein readily allows for multitrack editing with two or more speakers and high quality production, and automatically aligning multiple tracks from an online conversation, according to some embodiments. In addition, high quality audio conversations replace telephone sound in interviews, and non-audio professionals can generate high quality productions in a relatively easy fashion. Moreover, bandwidth is selectively used only where needed. The techniques provide value, for instance, to those interested in conducting online interviews or conversations, live and recorded, such as radio and television stations, podcasters, companies documenting conferences, to name a few examples.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

System Architecture

Various embodiments disclosed herein implement a communication session recording system using one or more programmable devices. FIG. 1 illustrates one example in accord with some of these embodiments, a session recording system 100. As shown in FIG. 1, the recording system 100 includes session client devices 110, 112, and 114, a session host device 118, a multitrack management device 116, and a communication network 120. Illustrated users of the session recording system 100 include users 102, 104, 106, and 108.

Each of the session client devices 110, 112, and 114, the session host device 118, the multitrack management device 116 and at least some portions of the communication network 120 are or include one or more programmable devices. These programmable devices may be any of a variety of standardized and special purpose devices, such as personal computers, workstations, servers, cellular telephones, and personal digital assistants. Broadly stated, the network 120 may include any communication network through which programmable devices may exchange information. For example, the network 120 may be a public network, such as the Internet, that is implemented with various IP-based network forwarding devices. The network 120 may also be or include other public or private networks such as LANs, WANs, cellular networks, extranets and intranets.

In some embodiments, the network 120 is configured to communicate (e.g., transmit or receive) information with connected programmable devices, such as the session client devices 110, 112, and 114, the session host device 118, and the multitrack management device 116. As depicted in FIG. 1, the network 120 is configured to communicate both synchronous information streams and asynchronous information packets. In FIG. 1, streams are illustrated using solid arrows and packets are illustrated using dashed arrows. When executing according to its configuration in one example, the network 120 receives streams including audio signals, session metadata, and marker metadata from the session client devices 110, 112, and 114 and transmits streams including the audio signals, session metadata, and marker metadata to the session host device 118. Also, according to this example, the network 120 receives streams including audio signals from the session host device 118 and transmits streams including audio signals to the session client devices 110, 112, and 114. When executing according to another configuration, the network 120 receives packets including audio signals and session metadata from the session client devices 110, 112, and 114 and transmits packets including the audio signals and session metadata to the session host device 118. In some embodiments, the network 120 is also configured to communicate information descriptive a multitrack audio file to the multitrack management device 116.

In some embodiments illustrated by FIG. 1, each of the session client devices 110, 112, and 114 is configured to execute one or more processes that support a real time, audio communication session among the users 102, 104, and 106. In these embodiments, each of the session client devices 110, 112, and 114 is also configured to execute one or more processes that transmit packets including session metadata and high quality audio signals to the session host device 118. When executing according to this configuration, each of the session client devices 110, 112, and 114 implements a variety of components described below with reference to FIG. 2. These components, in turn, execute one or more session recording processes described further below with reference to FIG. 3.

In other embodiments illustrated by FIG. 1, the session host device 118 is configured to execute one or more processes that communicate streams including compressed audio signals, session metadata, and marker metadata and packets including high quality audio signals and session metadata with the session client devices 110, 112, and 114. In these embodiments, the compressed audio signals are compressed into a lossy format. Further, in some embodiments, the session host device 118 is configured to automatically synchronize high quality audio tracks based on the high quality audio signals to the timing of compressed audio tracks based on the compressed audio signals. In these embodiments, the high quality audio signals are uncompressed or compressed into a lossless format. When executing according to this configuration, the session host device 118 implements a variety of components described below with reference to FIG. 2. These components, in turn, execute one or more session recording processes described further below with reference to FIGS. 3 and 4 to create multitrack audio files, such as the multitrack audio files described further below with reference to FIG. 5.

In another embodiment illustrated by FIG. 1, the multitrack management device 116 is configured to provide a user interface that accesses a multitrack audio file. When executing according to this configuration, the multitrack management device 116 provides the user 108 with a user interface through which the multitrack management device 116 may receive user input requesting a variety of operations. For example, the user input may request download of the multitrack audio file and the high quality audio tracks, or the user input may request manipulation of the multitrack audio file at its current physical location. Alternatively, the user input may request that the multitrack audio file be exported as a down mix online. User input requesting other processing of the multitrack audio file may be supported by the user interface, and the embodiments disclosed herein are not limited to a particular set of multitrack audio file processing operations.

Although FIG. 1 illustrates three session client devices, one session host device, and one multitrack management device, the embodiments disclosed herein are not limited to a particular number of devices. Other embodiments may include more or fewer numbers of each type of device or may include other types of devices without departing from the scope of the embodiments disclosed herein.

Figure 2:
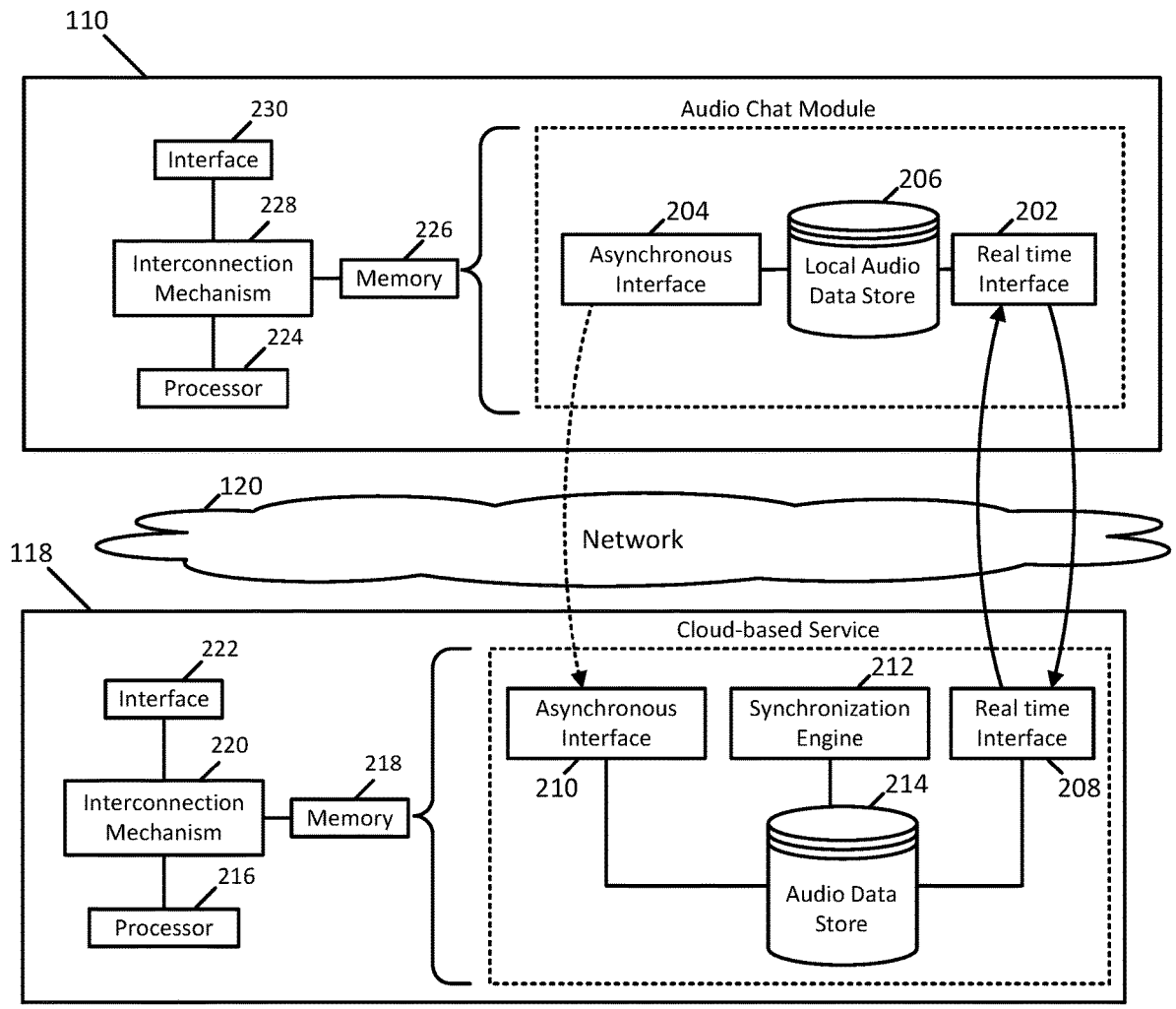
FIG. 2 is a block diagram illustrating an example session host device and an example session client device configured in accordance with one or more embodiments of the present disclosure.

FIG. 2 shows a more detailed view of the session client device 110 and the session host device 118. As shown in FIG. 2, the session client device 110 includes a processor 224, a memory 226, an interconnection mechanism 228, an interface 230, a real time interface 202, an asynchronous interface 204, and a local audio data store 206. The session host device includes a processor 216, a memory 218, an interconnection mechanism 220, an interface 222, a real time interface 208, an asynchronous interface 210, a synchronization engine 212, and an audio data store 214.

As illustrated in FIG. 2, the session host device 118 and the session client device 110 each include a suite of components that are standard for a programmable device. These components are the processors 216 and 224, the memory 218 and 226, the interconnection mechanisms 220 and 228, and the interfaces 222 and 230. Although the particular types and models of the standard components may vary between any two of the programmable devices described herein, it is appreciated that each programmable device includes a processor, memory, interconnection mechanism, and an interface as described below with reference to the host session 118.

The interface 222 includes one or more physical interface devices such as input devices, output devices, and combination input/output devices and a software stack configured to drive operation of the devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanism 220 is a communication coupling between the processor 216, the memory 218, and the interface 222. The interconnection mechanism 220 may include one or more physical busses in conformance with specialized or standard computing bus technologies such as IDE, SCSI, PCI, and InfiniBand. The interconnection mechanism 220 enables communications, including instructions and data, to be communicated between the processor 216, the memory 218, and the interface 222.

The memory 218 includes readable and/or writeable data storage that stores programs and data used or manipulated during operation of a programmable device. The programs stored in the memory 218 are a series of instructions that are executable by the processor 216. The memory 218 may include relatively high performance data storage, such as registers, caches, dynamic random access memory, and static memory. The memory 218 may further include a relatively low performance, non-volatile data storage medium such as flash memory or an optical or magnetic disk. Various embodiments may organize the memory 218 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processor 216 executes a series of instructions (i.e., one or more programs) that result in manipulated data. The processor 216 may be any type of processor, multiprocessor, microprocessor, or controller known in the art. The processor 216 is connected to and communicates data with the memory 218 and the interface 222 via the interconnection mechanism 220. In operation, the processor 216 causes data to be read from a non-volatile (i.e., non-transitory) data storage medium in the memory 218 and written to high performance data storage. The processor 216 manipulates the data within the high performance data storage, and copies the manipulated data to the data storage medium after processing is completed.

In addition to the standard suite of components described above, both the session host device 118 and the session client device 110 (and the session client devices 112 and 114) include several customized components. For example, the session host device 118 includes the real time interface 208, the asynchronous interface 210, the synchronization engine 212, and the audio data store 214. In at least one embodiment, each of these customized components is implemented by the processor 216. As shown in FIG. 2, the customized components of the session client device 110 include the real time interface 202, the asynchronous interface 204, and the audio data store 214.

In some embodiments, the real time interface 202 is configured to interact with a user (e.g., the user 102) during a live, audio-based communication session between the user and other users (e.g., the user 104 and the user 106). The user interaction that the real time interface 202 is configured to process may include requests to insert marker metadata. This marker metadata may identify important temporal locations within the high quality audio signals, such as start times, end times, and intermediate milestone times between the start times and end times.

In some embodiments, the real time interface 202 is also configured to communicate a stream of associated data (e.g., compressed audio signals, marker metadata, and session metadata) with the real time interface 208 via the interface 230 and the network 120. The session metadata may include one or more identifiers of the communication session and the session client device 110. In these embodiments, the real time interface 202 is further configured to store, within the local audio data store 206, high quality audio signals that capture the user's utterances during the communication session. When executing according to its configuration, the real time interface 202 executes several acts described further below with reference to FIG. 3.

In other embodiments, the asynchronous interface 204 is configured to retrieve the high quality audio signals from the local audio data store 206 and transmit packets of associated data (e.g., session metadata and the high quality audio signals) to the asynchronous interface 210 via the interface 230 and the network 120. When executing according to its configuration, the asynchronous interface 204 executes several acts described further below with reference to FIG. 3.

In some embodiments, the local audio data store 206 is configured to store high quality audio signals that capture the user's utterances during the communication session.

In some embodiments, the real time interface 208 is configured to receive session metadata from the session client devices (e.g., the session client devices 110, 112, and 114) and facilitate the communication session between the users via the interface 222 and the network 120. In these embodiments, the real time interface 208 is also configured to create a multitrack compressed audio file (e.g., the multitrack compressed audio file 502) based on streams received from real time interfaces (e.g., the real time interface 202 implemented as by the session client devices) during the communication session. In these embodiments, the real time interface 208 is further configured to store, in the audio data store 214, the multitrack audio file, session metadata, and marker metadata generated during the communication session. When executing according to its configuration, the real time interface 208 executes several acts described further below with reference to FIG. 3.

In other embodiments, the asynchronous interface 210 is configured to receive, via the network 120 and the interface 222, packets transmitted by the asynchronous interface 204. These packets may include session metadata and high quality audio signals. In some embodiments, the asynchronous interface 210 is also configured to store the session metadata and the high quality audio signals in the audio data store 214. In these embodiments, the asynchronous interface 210 may store the high quality audio signals received from the asynchronous interface 204 as, or in association, with a high quality audio track that is distinct from other high quality audio tracks associated with other asynchronous interfaces (e.g., the asynchronous interface 204 as implemented by the session client devices 112 and 114). When executing according to its configuration, the asynchronous interface 210 executes several acts described further below with reference to FIG. 3.

In some embodiments, the synchronization engine 212 is configured to create a multitrack high quality audio file from the multitrack compressed audio file, the session metadata, and the high quality audio tracks stored in the audio data store 214. When executing according to its configuration, the synchronization engine 212 executes several acts described further below with reference to FIGS. 3 and 4.

In some embodiments, the components disclosed herein may create, read, update, and delete parameters that affect the functions performed by the components. These parameters may be physically stored in any form of suitable memory including volatile memory or non-volatile memory. In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Although an embodiment implementing particular functionality is discussed herein with reference to particular components, it should be noted that, in other embodiments, the functionality of individual components can be separated into multiple components, and/or at least some functionality of multiple components can be combined into a single component. Information may flow between the any of the components described herein using a variety of techniques. Such techniques include, for example, passing the information over a network using standard protocols, such as TCP/IP or HTTP or HTTPS, and passing the information between components via data structures written in shared volatile or non-volatile memory. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Although the session host device 118 and the client host device 110 are shown by way of example as types of programmable device capable of executing the processes disclosed herein, embodiments are not limited to being implemented on the programmable devices shown in FIG. 2. Various processes may be practiced on one or more programmable devices having a different architectures or components than those shown in FIG. 2. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a programmable device as disclosed herein may be implemented in software, hardware, firmware, or any combination thereof.

Figure 3:
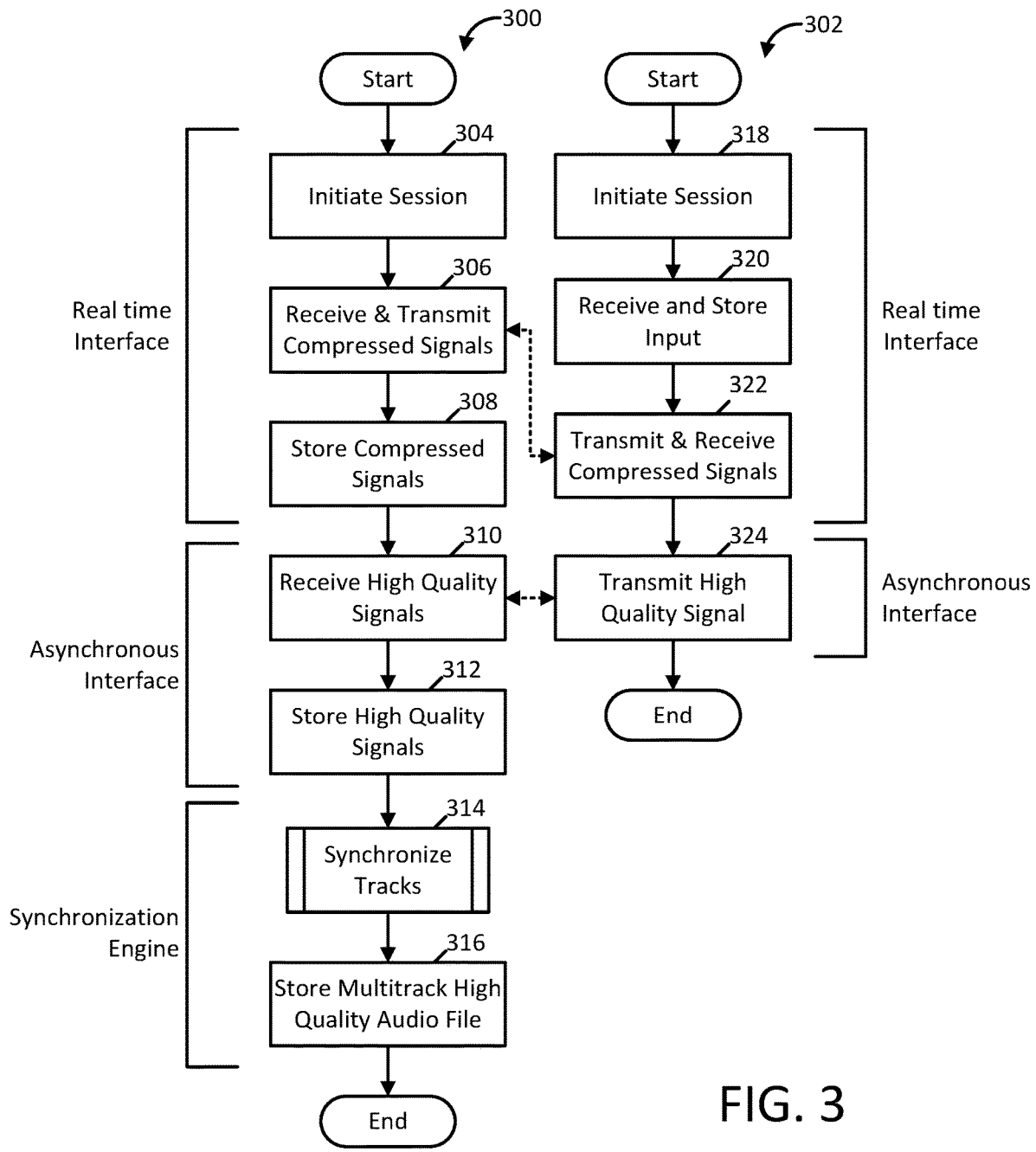
FIG. 3 is a combination of two flowcharts illustrating example session recording processes in accordance with one or more embodiments of the present disclosure.

As described above, some embodiments execute session recording processes using one or more programmable devices, such as the programmable devices described above with reference to FIGS. 1 and 2. FIG. 3 illustrates two session recording processes, a client recording process 302 and a multitrack media file generation process 300.

The client recording process 302 includes acts executed by a real time interface (e.g., the real time interface 202) and an asynchronous interface (e.g., the asynchronous interface 204). The client recording process 302 enables a user to participate in a communication session in real time, while also recording the user's utterances in a high quality format for subsequent asynchronous transmission to a session host device (e.g., the session host device 118).

The client recording process 302 starts in act 318 where the real time interface initiates a communication session. In some embodiments, initialization activities executed in the act 318 include allocation of storage space in a local audio data store (e.g., the local audio data store 206) and generation of an identifier of the communication session.

In act 320, the real time interface receives and processes a digital audio signal from a microphone included in the interface 222. In some embodiments, in preparation of act 322, the processing executed by the real time interface in the act 320 includes compressing the digital audio signal to facilitate interactive communication between users (e.g., the users 102, 104, and 106) in real time. The real time interface may compress the digital audio signal to a lossy format. In other embodiments, the processing of the act 320 includes storing the digital audio signal as a high quality audio signal in the local audio data store. A high quality audio signal may include an uncompressed audio signal or a losslessly compressed audio signal.

Also in the act 320, the real time interface receives and processes user input requesting insertion of marker metadata. The real time interface may receive the user input from, for example, the microphone (e.g., a verbal command), a touch screen included in the interface 222, or some other input device. In response to receiving the request, the real time interface may store, in the local data store, marker metadata that includes an identifier of a temporal location within the communication session of the marker (e.g., a timestamp) and a type of marker (e.g., chapter end, exit point of specific speaker, etc.).

In the act 322, the real time interface transmits one or more streams including the compressed audio signal, the marker metadata, and session metadata to a corresponding real time interface (e.g., real time interface 208) of a session host device. The session metadata may include an identifier of a session client device executing the client recording process 302 and an identifier of the communication session generated in the act 302.

Also in the act 322, the real time interface receives a stream from the corresponding real time interface. This stream may include compressed audio signals. In some embodiments, the compressed audio signals include audio signals generated by other users participating in the communication session. In these embodiments, the real time interface transmits these compressed audio signals to a speaker (e.g., the interface 222) for presentation to the user of the session client device.

In act 324, an asynchronous interface (e.g., the asynchronous interface 204) retrieves the high quality audio signal from the local audio data store and transmits packets including the session metadata and the high quality audio signal to a corresponding asynchronous interface (e.g., the asynchronous interface 210) of the session host device. In some embodiments, the asynchronous interface dynamically throttles the rate of transmission of the packets according to the amount of unutilized network bandwidth available to the session client device. For example, in at least one embodiment, the asynchronous interface estimates the amount of unutilized network bandwidth and compares this estimate to a threshold value. Where the estimate exceeds the threshold value, the asynchronous interface transmits packets including the high quality audio signal at a rate that consumes some or all of the unutilized bandwidth. It is appreciated that, in situations where there is sufficient bandwidth available, transmission of the packets may begin while the communication session is ongoing. Moreover, in at least one embodiment where the interface 222 supports multiple connections to discrete networks (e.g., a cellular antenna to a cellular network and a network connection to a wireless or wired LAN), the asynchronous interface may transmit packets using a first connection (e.g., a network connection) that is distinct from a second connection (e.g., a cellular connection) used by the real time interface.

Processes in accord with the client recording process 302 enable session client devices to facilitate real time communications between participants in a communication session, while also supporting automatic generation of high quality recordings.

Turning now to the next session recording process, the media file generation process 300 includes acts executed by a real time interface (e.g., the real time interface 208), an asynchronous interface (e.g., the asynchronous interface 210), and a synchronization engine (e.g., the synchronization engine 212). The media file generation process uses audio data generated during a communication session between two or more users (e.g., the users 102, 104, and 106) to create a multitrack high quality media file (e.g., the multitrack high quality audio file 504 described further below) that is suitable for publication.

The media file generation process 300 starts with act 304 where the real time interface initiates a communication session. In some embodiments, initialization activities executed in the act 304 include allocation of storage space in an audio data store (e.g., the audio data store 214) and generation of an identifier of the communication session. In some embodiments, the real time interface, within the act 304, creates a multitrack compressed audio file (e.g., multitrack compressed audio file 502, which is describe further below) in the allocated space and associates the multitrack compressed audio file with the communication session. In at least one embodiment, the real time interface associates the multitrack compressed audio file the with communication session by storing an association between an identifier of the multitrack compressed audio file and the communication session identifier.

In act 306, the real time interface receives and processes a plurality of streams including session metadata, marker metadata, and compressed audio signals from a plurality of corresponding real time interfaces (e.g., the real time interface 202 as implemented by the session client devices 110, 112, and 114). In some embodiments, this processing includes parsing each stream to identify the session metadata, the marker metadata, and the compressed audio signals included therein. In these embodiments, the processing also includes generating and transmitting a plurality of return streams to the corresponding real time interfaces. Each of the return streams may include a combination of the compressed audio signals received from corresponding real time interfaces other than the corresponding real time interface to which the return stream is being transmitted.

In the act 308, the real time interface stores the parsed compressed audio signals in, or in association with, the multitrack compressed audio file. In some embodiments, the real time interface stores the compressed audio signals for each session client device participating in the communication session (as identified in the session metadata) as, or in association with, a distinct track in the multitrack compressed audio file. In these embodiments, the real time interface also stores, in the audio data store, a start time for each track and any marker metadata and session metadata associated with the compressed audio signals.

In act 310, an asynchronous interface (e.g., the asynchronous interface 210) receives and processes packets including session metadata and high quality audio signals from a plurality of corresponding asynchronous interfaces (e.g., the asynchronous interface 204 as implemented by the session client devices 110, 112, and 114). In some embodiments, this processing includes parsing the packets to identify the session metadata and the high quality audio signals included therein. In act 312, the asynchronous interface stores the parsed session metadata and the high quality audio signals in the audio data store. In some embodiments, the asynchronous interface stores the high quality audio signals received from each session client device in the communication session (as indicated in the session metadata) as, or in association with, a distinct track.

In act 314, a synchronization engine (e.g., the synchronization engine 212) generates a multitrack high quality audio file for the communication session. In act 316, the synchronization engine stores the multitrack high quality audio file in the audio data store for subsequent processing (via, for example, the multitrack management device 116).

Figure 4:
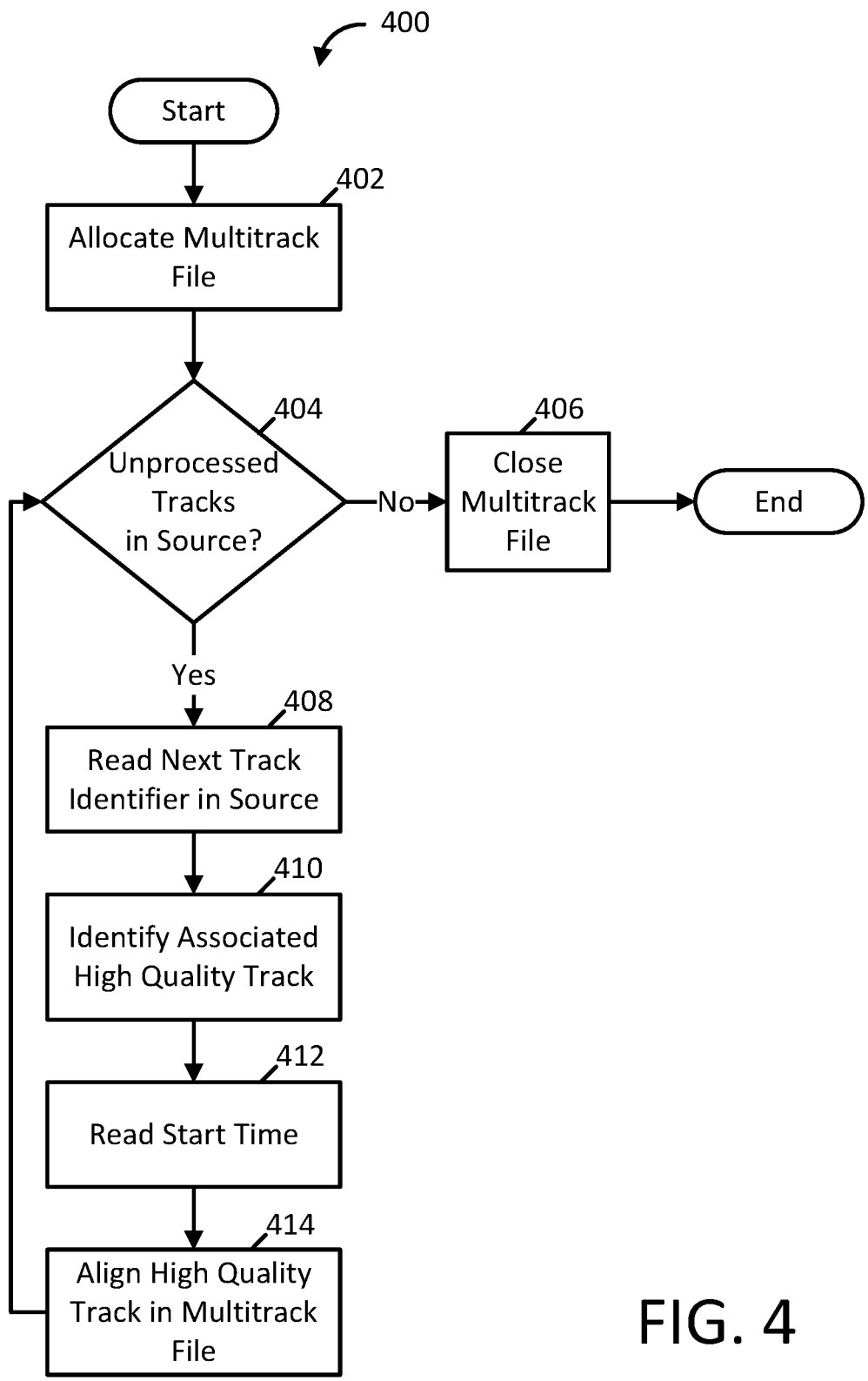
FIG. 4 is a flowchart illustrating an example track synchronization process in accordance with one or more embodiments of the present disclosure.

FIG. 4 illustrates a track synchronization process 400 executed by the synchronization engine in the act 314 according to some embodiments. The synchronization process 400 starts with act 402 where the synchronization engine allocates storage for a multitrack high quality audio file (e.g., the multitrack high quality audio file 504 described below). In act 404, the synchronization engine determines whether unprocessed tracks remain in the multitrack compressed audio file. If not, the synchronization engine closes the multitrack high quality audio file in act 406 and the synchronization process 400 ends. If, however, unprocessed tracks remain, the synchronization engine executes act 408.

In the act 408, the synchronization engine reads an identifier of the next unprocessed track in the multitrack compressed audio file. In act 410, the synchronization engine associates a high quality audio track with the unprocessed track by matching session metadata associated with the compressed audio signals stored in, or in association with, the unprocessed track with session metadata associated with high quality audio signals stored in, or in association with, a high quality audio track. More specifically, in some embodiments, the synchronization engine compares one or more identifiers of the communication session and the session client device associated with the compressed audio signals to one or more identifiers of the communication session and the session client device associated with the high quality audio signals. In these embodiments, the synchronization engine associates the high quality audio track with the unprocessed track where the one or more identifiers of the communication session and the session client device associated with the compressed audio signals are equal to the one or more identifiers of the communication session and the session client device associated with the high quality audio signals.

In act 412, the synchronization engine identifies a start time of the unprocessed track within the multitrack compressed audio file. In act 414, the synchronization engine stores the matched high quality audio track at a start time having a value derived from the start time of the unprocessed track within the multitrack high quality audio file. For example, the derived value may be equal to the value of the start time of the unprocessed track. Next, in some embodiments, the synchronization engine further shifts the waveform of the high quality audio signals stored in, or in association with, the high quality audio track so that one or more points of interest in the waveform coincide, to a configurable tolerance threshold, with one or more corresponding points of interest in the compressed audio signals stored in, or in association with, the unprocessed audio track. These points of interest may include one or more peak amplitude values, trough amplitude value, rising-edge zero-crossings, or falling-edge zero-crossings. Additionally, the points of interest may be defined to be located after any marker (e.g., start time, specific intermediate milestone, enumerate intermediate milestones, etc.).

Processes in accord with the synchronization process 400 enable session host devices to generate automatically a high quality reproduction of a communication session conducted between individuals located at disparate geographic locations.

Each of processes 300, 302, and 400 depict one particular sequence of acts in a particular example. The acts included in these processes may be performed by, or using, one or more programmable devices specially configured as discussed herein. Some acts are optional and, as such, may be omitted in accord with one or more examples. Additionally, the order of acts can be altered, or other acts can be added, without departing from the scope of the embodiments discussed herein. Furthermore, as discussed above, in at least one example, the acts are performed on a particular, specially configured machine, namely a session recording system configured according to the examples and embodiments disclose d herein.

Figure 5:
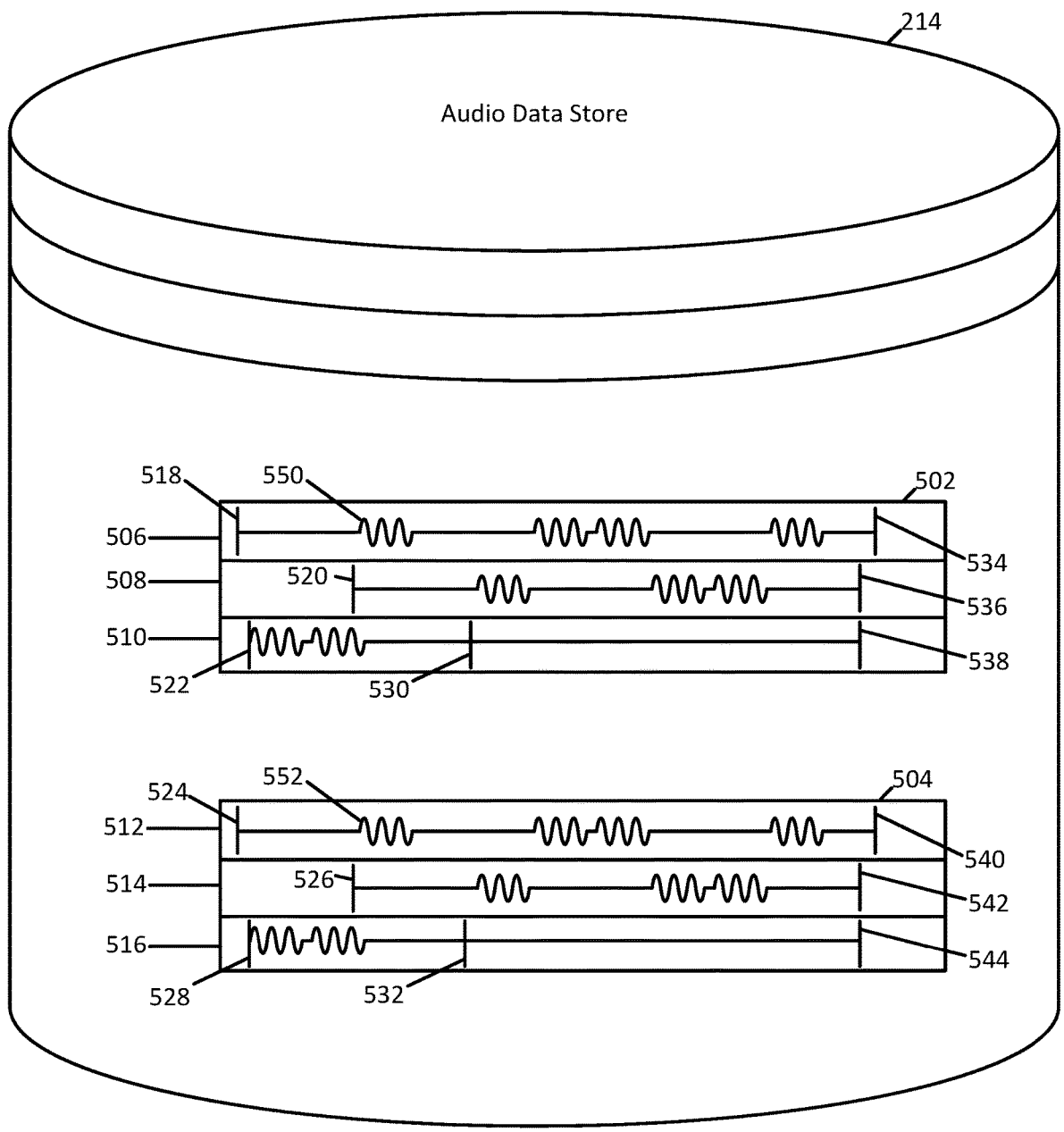
FIG. 5 is a block diagram graphically illustrating multitrack files in accordance with one or more embodiments of the present disclosure.

As referred to above, FIG. 5 illustrates a multitrack compressed audio file 502 and a multitrack high quality audio file 504. The multitrack compressed audio file 502 includes tracks 506, 508, and 510. Tracks 506, 508, and 510 include compressed audio signal times 518, 520, and 522 and compressed audio signals end times 534, 536, and 538. Tracks 506, 508, and 510 also include, or reference, compressed audio signals (of which 550 is representative). Track 510 also includes a marker 530.

The multitrack high quality audio file 504 includes tracks 512, 514, and 516. Tracks 512, 514, and 516 include high quality audio signal times 524, 526, and 528 and high quality audio signals end times 540, 542, and 544. Tracks 512, 514, and 516 also include, or reference, high quality audio signals (of which 552 is representative). Track 516 also includes a marker 532.

As shown in FIG. 5, each of the tracks 512, 514, and 516 is respectively synchronized with its corresponding track 506, 508, and 510. Further, as illustrated in FIG. 5, the markers 530 and 532 indicate temporal locations of interest within their respective tracks. This location may be, for example, a location specified within a request to insert marker metadata received by from user input. The request may further specify (via marker metadata) that a user left the communication session at the marked location.

In some embodiments, the tracks of the multitrack audio files described herein are indexes that are physically stored separately from the audio signals referenced in the indexes. In other embodiments, the tracks are indexes that are physically stored in the same file as one or more of audio signals referenced in the indexes. When interpreted in view of embodiments where tracks are stored separately from the audio signals, recitations that state that audio signals are stored in or included in a multitrack file should be interpreted to mean that identifiers (e.g., references or other pointers) to the audio signals are stored in tracks within the multitrack file.

Further Example Embodiments

In at least one embodiment, a system comprising a session host device is provided. The session host device includes a memory; at least one processor coupled to the memory; and a cloud-based service executable by the at least one processor. The cloud-based service is configured to receive a plurality of streams including lossy audio signals from a plurality of session client devices; store lossy audio tracks associated with the lossy audio signals in a first multitrack file; receive a plurality of packets of including high quality audio signals from the plurality of session client devices, the high quality audio signals being either losslessly compressed or uncompressed; store high quality audio tracks associated with the high quality audio signals in second multitrack file; and align the second multitrack file to the first multitrack file.

In the system, each of the lossy audio tracks may have a start time and the cloud-based service may be configured to align the second multitrack file to the first multitrack file at least in part by: matching a first identifier of a lossy audio track to a second identifier of a high quality audio track; and setting a start time of the high quality audio track equal to a start time of the lossy audio track. A lossy audio signal associated with the lossy audio track may have a first waveform. A high quality audio signal associated with the high quality audio track may have a second waveform. The cloud-based service may be configured to align the second multitrack file to the first multitrack file at least in part by comparing a first point of interest in the first waveform to a second point of interest in the second waveform and shifting the high quality audio track to align the second point of interest with the first point of interest. The first identifier and the second identifier both may include one or more identifiers of a communication session and a session client device.

In the system, the cloud-based service may be further configured to transmit one or more of the lossy audio signals to one or more session client devices of the plurality of session client devices. The cloud-based service may be configured to receive at least one packet of the plurality of packets prior to completing receipt of at least one stream of the plurality of streams. The plurality of streams may include at least three streams.

The system may further comprise a cellular network through which the cloud-based service is configured to receive the plurality of streams. The system may further comprise the plurality of session client devices, wherein at least one session client device of the plurality of session client devices is a mobile device. The system may further comprise a multitrack management device configured to access the second multitrack file and provide a user interface in which the second multitrack file is presented as a multitrack audio project. In the system, the first multitrack file may include a marker at a first temporal location within the first multitrack file and the cloud-based service may be further configured to insert another marker in the second multitrack file at a temporal location within the second multitrack file that corresponds to the first temporal location.

In another embodiment, a method implemented by a system including a session host device is provided. The method comprises acts of receiving a plurality of streams including lossy audio signals from a plurality of session client devices; storing lossy audio tracks associated with the lossy audio signals in a first multitrack file; receiving a plurality of packets of including high quality audio signals from the plurality of session client devices, the high quality audio signals being either losslessly compressed or uncompressed; storing high quality audio tracks associated with the high quality audio signals in a second multitrack file; and aligning the second multitrack file to the first multitrack file.

In the method, each of the lossy audio tracks may have a start time and aligning the second multitrack file to the first multitrack file may include matching a first identifier of a lossy audio track to a second identifier of a high quality audio track; and setting a start time of the high quality audio track equal to a start time of the lossy audio track. A lossy audio signal associated with the lossy audio track may have a first waveform. A high quality audio signal associated with the high quality audio track may have a second waveform. The act of aligning the second multitrack file to the first multitrack file may include acts of: comparing a first point of interest in the first waveform to a second point of interest in the second waveform; and shifting the high quality audio track to align the second point of interest with the first point of interest.

In the method, the act of matching the first identifier of the lossy audio track to the second identifier of the high quality audio track may include an act of matching one or more identifiers of a communication session and a session client device. The method may further comprise an act of transmitting one or more of the lossy audio signals to one or more session client devices of the plurality of session client devices.

In another embodiment, a non-transitory computer readable medium storing computer executable instructions is provided. The instructions are configured to instruct at least one processor to execute a method of automatically generating a second multitrack file from a first multitrack file. The method comprises acts of: receiving a plurality of streams including lossy audio signals from a plurality of session client devices; storing lossy audio tracks associated with the lossy audio signals in a first multitrack file; receiving a plurality of packets of including high quality audio signals from the plurality of session client devices, the high quality audio signals being either losslessly compressed or uncompressed; storing high quality audio tracks associated with the high quality audio signals in a second multitrack file; and aligning the second multitrack file to the first multitrack file.

In the computer readable medium, each of the lossy audio tracks may have a start time and aligning the second multitrack file to the first multitrack file may include acts of: matching a first identifier of a lossy audio track to a second identifier of a high quality audio track; and setting a start time of the high quality audio track equal to a start time of the lossy audio track. A lossy audio signal associated with the lossy audio track may have a first waveform. A high quality audio signal associated with the high quality audio track may have a second waveform. The act of aligning the second multitrack file to the first multitrack file may include acts of: comparing a first point of interest in the first waveform to a second point of interest in the second waveform; and shifting the high quality audio track to align the second point of interest with the first point of interest. In the computer readable medium, the act of matching the first identifier of the lossy audio track to the second identifier of the high quality audio track may include matching one or more identifiers of a communication session and a session client device.

Having thus described several aspects of at least one embodiment, it is to be appreciated that various alterations, modifications, and improvements will readily occur to those skilled in the art. For instance, embodiments disclosed herein may also be used in other contexts wherein the recordings include both audio and video data. Such alterations, modifications, and improvements are intended to be part of this disclosure, and are intended to be within the scope of the embodiments discussed herein. Accordingly, the foregoing description and drawings are by way of example only.

What is claimed is:

1. A system comprising a session host device including:
   a memory;
   at least one processor coupled to the memory; and
   a cloud-based service executable by the at least one processor and configured to:
   receive, within an interactive, real time communication session, a plurality of streams including lossy audio signals from a plurality of session client devices;
   store lossy audio tracks associated with the lossy audio signals in a first multitrack file, thereby creating a low quality recording of a conversation between a plurality of participants associated with the plurality of session client devices, the first multitrack file comprising a marker at a first temporal location within the first multitrack file;
   receive a plurality of packets of including high quality audio signals from the plurality of session client devices, the high quality audio signals being either losslessly compressed or uncompressed;

store high quality audio tracks associated with the high quality audio signals in a second multitrack file;

align the second multitrack file to the first multitrack file, thereby creating a high quality recording of the conversation; and insert another marker in the second multitrack file at a temporal location within the second multitrack file that corresponds to the first temporal location.

2. The system of claim 1, wherein each of the lossy audio tracks has a start time and the cloud-based service is configured to align the second multitrack file to the first multitrack file at least in part by:

matching a first identifier of a lossy audio track to a second identifier of a high quality audio track; and setting a start time of the high quality audio track equal to a start time of the lossy audio track.

3. The system of claim 2, wherein a lossy audio signal associated with the lossy audio track has a first waveform, a high quality audio signal associated with the high quality audio track has a second waveform, and the cloud-based service is configured to align the second multitrack file to the first multitrack file at least in part by:

comparing a first point of interest in the first waveform to a second point of interest in the second waveform; and shifting the high quality audio track to align the second point of interest with the first point of interest.

4. The system of claim 2, wherein the first identifier and the second identifier both include one or more identifiers of a communication session and a session client device.

5. The system of claim 1, wherein the cloud-based service is further configured to transmit one or more of the lossy audio signals to one or more session client devices of the plurality of session client devices.

6. The system of claim 1, wherein the cloud-based service is configured to receive at least one packet of the plurality of packets prior to completing receipt of at least one stream of the plurality of streams.

7. The system of claim 1, wherein the plurality of streams includes at least three streams.

8. The system of claim 1, further comprising a cellular network through which the cloud-based service is configured to receive the plurality of streams.

9. The system of claim 8, further comprising the plurality of session client devices, wherein at least one session client device of the plurality of session client devices is a mobile device.

10. The system of claim 1, further comprising a multitrack management device configured to:

access the second multitrack file; and provide a user interface in which the second multitrack file is presented as a multitrack audio project.

11. A method implemented by a system including a session host device, the method comprising:

receiving, within an interactive, real time communication session, a plurality of streams including lossy audio signals from a plurality of session client devices;

storing lossy audio tracks associated with the lossy audio signals in a first multitrack file, thereby creating a low quality recording of a conversation between a plurality of participants associated with the plurality of session client devices, the first multitrack file comprising a marker at a first temporal location within the first multitrack file;

receiving a plurality of packets of including high quality audio signals from the plurality of session client devices, the high quality audio signals being either losslessly compressed or uncompressed;

storing high quality audio tracks associated with the high quality audio signals in a second multitrack file;

aligning the second multitrack file to the first multitrack file, thereby creating a high quality recording of the conversation; and inserting another marker in the second multitrack file at a temporal location within the second multitrack file that corresponds to the first temporal location.

12. The method of claim 11, wherein each of the lossy audio tracks has a start time and aligning the second multitrack file to the first multitrack file includes:

matching a first identifier of a lossy audio track to a second identifier of a high quality audio track; and setting a start time of the high quality audio track equal to a start time of the lossy audio track.

13. The method of claim 12, wherein a lossy audio signal associated with the lossy audio track has a first waveform, a high quality audio signal associated with the high quality audio track has a second waveform, and aligning the second multitrack file to the first multitrack file includes:

comparing a first point of interest in the first waveform to a second point of interest in the second waveform; and shifting the high quality audio track to align the second point of interest with the first point of interest.

14. The method of claim 12, wherein matching the first identifier of the lossy audio track to the second identifier of the high quality audio track includes matching one or more identifiers of a communication session and a session client device.

15. The method of claim 11, further comprising transmitting one or more of the lossy audio signals to one or more session client devices of the plurality of session client devices.

16. The method of claim 11, wherein receiving the plurality of streams comprises receiving at least one stream of the plurality of streams from a mobile device.

17. A non-transitory computer readable medium storing computer executable instructions configured to instruct at least one processor to execute a method of automatically generating a second multitrack file from a first multitrack file, the method comprising:

receiving, within an interactive, real time communication session, a plurality of streams including lossy audio signals from a plurality of session client devices;

storing lossy audio tracks associated with the lossy audio signals in a first multitrack file, thereby creating a low quality recording of a conversation between a plurality of participants associated with the plurality of session client devices, the first multitrack file comprising a marker at a first temporal location within the first multitrack file;

receiving a plurality of packets of including high quality audio signals from the plurality of session client devices, the high quality audio signals being either losslessly compressed or uncompressed;

storing high quality audio tracks associated with the high quality audio signals in a second multitrack file;

aligning the second multitrack file to the first multitrack file, thereby creating a high quality recording of the conversation; and inserting another marker in the second multitrack file at a temporal location within the second multitrack file that corresponds to the first temporal location.

18. The non-transitory computer readable medium of claim 17, wherein each of the lossy audio tracks has a start time and aligning the second multitrack file to the first multitrack file includes:
    matching a first identifier of a lossy audio track to a second identifier of a high quality audio track; and
    setting a start time of the high quality audio track equal to a start time of the lossy audio track.

19. The non-transitory computer readable medium of claim 18, wherein a lossy audio signal associated with the lossy audio track has a first waveform, a high quality audio signal associated with the high quality audio track has a second waveform, and aligning the second multitrack file to the first multitrack file includes:
    comparing a first point of interest in the first waveform to a second point of interest in the second waveform; and
    shifting the high quality audio track to align the second point of interest with the first point of interest.

20. The non-transitory computer readable medium of claim 18, wherein matching the first identifier of the lossy audio track to the second identifier of the high quality audio track includes matching one or more identifiers of a communication session and a session client device.

\* \* \* \* \*